United States Patent [19]

Meyborg et al.

[11] 4,298,701

[45] Nov. 3, 1981

[54] PROCESS FOR THE PRODUCTION OF ELASTIC SHAPED ARTICLES

[75] Inventors: Holger Meyborg, Odenthal; Christian Weber, Cologne, both of Fed. Rep. of Germany

[73] Assignee: Bayer Aktiengesellschaft, Leverkusen, Fed. Rep. of Germany

[21] Appl. No.: 139,921

[22] Filed: Apr. 14, 1980

[30] Foreign Application Priority Data

Apr. 24, 1979 [DE] Fed. Rep. of Germany ....... 2916485

[51] Int. Cl.³ ...................... C08G 18/14; C08G 18/32
[52] U.S. Cl. ...................... 521/51; 428/310; 521/126; 521/914; 528/58; 528/76; 528/77; 264/53; 264/328.14; 264/DIG. 14
[58] Field of Search ....................... 521/51, 914, 126; 528/58, 76, 77

[56] References Cited

U.S. PATENT DOCUMENTS

| | | | |
|---|---|---|---|
| 3,428,610 | 2/1969 | Klebert | 260/75 |
| 4,058,492 | 11/1977 | von Bonin et al. | 521/51 |
| 4,190,711 | 2/1980 | Zdrahala et al. | 521/914 |
| 4,254,069 | 3/1981 | Domiuguez et al. | 521/914 |

FOREIGN PATENT DOCUMENTS 1534258  11/1978  United Kingdom ................. 521/51

OTHER PUBLICATIONS

Baumann, Rubber Chemistry & Technology vol. 45, Issue 5(1972) pp. 1485-1496.

*Primary Examiner*—H. S. Cockeram
*Attorney, Agent, or Firm*—Gene Harsh; Joseph C. Gil

[57] ABSTRACT

This invention relates to an improved single-stage process for the production of elastic shaped articles having an impervious surface layer by the reaction injection molding technique in which highly reactive systems of polyisocyanates, relatively high molecular weight polyhydroxyl compounds and aromatic polyamines are used.

8 Claims, No Drawings

PROCESS FOR THE PRODUCTION OF ELASTIC SHAPED ARTICLES

FIELD OF THE INVENTION

This invention relates to an improved single-stage process for the production of elastic shaped articles having an impervious surface layer by the reaction injection molding technique in which highly reactive systems of polyisocyanates, relatively high molecular weight polyhydroxyl compounds and aromatic polyamines are used.

BACKGROUND OF THE INVENTION

The production of shaped articles having an impervious surface layer by the isocyanate-polyaddition process is known. It is carried out, for example, by introducing a reactive and, optionally, foamable mixture based on compounds containing several reactive hydrogen atoms and polyisocyanates into a mold (cf. for example, German Auslegeschrift No. 1,196,864 [British Pat. No. 969,114]). The compounds containing reactive hydrogen atoms used in the above reference are preferably polyethers and polyesters containing hydroxyl groups and the polyisocyanates used are, for example, 2,4- and 2,6-tolylene diisocyanate and isomer mixtures thereof. Also suitable are the polyphenyl-polymethylene-polyisocyanates obtained by condensing aniline with formaldehyde, followed by phosgenation. Water and/or fluorochlorinated hydrocarbons, for example, may be used as blowing agents. Catalysts known in the art for the production of polyurethanes are also generally used.

By suitably selecting the starting components, it is possible, by this process, to produce elastic products, rigid products and also variants falling between these two extremes.

As explained in German Offenlegungsschrift No. 2,622,951 (British Pat. No. 1,534,258, it is possible to use systems containing diamines as chain-extending agents, but generally not by a one-shot process. Where diamine chain-extenders are used, it is necessary first to prepare a "prepolymer" containing NCO groups. This "prepolymer" is then reacted with the diamine in a second stage to form the high molecular weight elastomer (German Auslegeschrift No. 1,240,654 [U.S. Pat. No. 3,428,610]).

The production of heavily stressed moldings generally requires the use of starting materials having a slightly branched structure which, after processing, give materials having a property spectrum resembling that of elastomers. Such moldings have been commercially produced for some time (for example, as soles in the shoe industry). Large moldings are used in the automobile industry.

The starting materials are processed into body work sections primarily by the so-called "reaction injection molding" (RIM) process. This process is a filling technique in which the highly active, liquid starting components are rapidly injected into the mold through high output, high pressure metering units after mixing in so-called "static impingement" mixing heads.

A detailed description of the reaction injection molding process may be found, for example, in the following publications: Piechota/Rohr: "Integralschaumstoffe (Integral Foams)", Carl Hanser Verlag, Munich/Vienna 1975; Prepelka/Wharton: "Reaction Injection Molding in the Automotive Industry", Journal of Cell. Plastics, Volume II, No. 2, 1975; Knipp: "Plastics for Automobile Safety Bumpers", Journal of Cell. Plastics, No. 2, 1973.

It is possible by the reaction injection molding (RIM) technique to produce large moldings weighing from 3 to 10 kg and more. These large moldings are used, for example, in the form of flexible body work sections in the automotive industry. They are known in the auto industry as so-called "soft face" elements, i.e. reversibly formable front or rear parts of motor vehicles.

Rim injected molding has lead to the molding of parts as described above with the attainment of several advantages. Namely, large quantities of two liquid, highly reactive starting products are rapidly delivered (in from about two to four seconds) and, at the same time, mixed and introduced into a mold where hardening to form the final molding takes place very quickly for polyurethane materials (from 1 to 2 minutes).

Before this new technology could be adopted for practical use, however, three problems had to be solved.

First, because of the high reactivity of the two starting components (polyisocyanate and polyisocyanate-reactive compounds), the reaction mixture has to be introduced into the mold in the shortest possible time. This time should at most be as long as the cream time. Thus, there was a need to develop high-performance axial and radial piston pumps which, when built into high pressure machines, would enable throughputs of from 2.5 to 6.5 kg/second to be obtained. Such machines are described, for example, in German Offenlegungsschriften Nos. 1,778,060 and 2,146,054 (British Pat. No. 1,382,741).

Secondly, the exact metering of the two components in a predetermined ratio, depending on the particular formulation, throughout the entire duration of the "shooting-in" phase is necessary. Additionally, thorough admixture thereof from the first to the last drop is essential to obtain a fault-free molding. Satisfactory admixture is made very difficult due to the high flow velocities of the two components and the extremely short residence time in the mixing chamber of the mixing head. This problem was solved by using so-called "static impingement" mixing heads operating on the "countercurrent injection principle" (cf. German Auslegeschrift No. 1,948,999 [U.S. Pat. No. 3,709,640] and also German Offenlegungsschriften Nos. 2,007,935 [U.S. Pat. No. 3,706,515]; 2,219,389 [U.S. Pat. No. 3,857,550] and 2,364,501 [U.S. Pat. No. 3,926,219]).

Thirdly, when the reaction mixture enters the closed mold, the air contained therein is almost instantaneously displaced. In order to prevent undesirable inclusions of air and, therefore, faults in the end product, the liquid flowing in has to push the air along in front of it in the form of a "flow front" and force it out at predetermined slot-like vents. Thus, in order to completely prevent turbulence during filling, the material has to enter the mold over a considerable width in the form of a laminar flow along the mold wall. This problem has been overcome through the development of a certain gating technique using so-called "film gates", of the type described in German Offenlegungsschriften Nos. 2,348,658 [U.S. Pat. No. 3,991,147] and 2,348,608 [U.S. Pat. No. 3,908,966]).

German Offenlegungsschrift No. 2,622,951 (British Pat. No. 1,534,258) describes how even highly reactive mixtures, i.e. one-shot mixtures, of active polyisocyanates, active aromatic polyamines, relatively high molecular weight polyhydroxyl compounds containing primary hydroxyl groups and strong catalysts, having cream times of less than one second, may be processed by this method. With such systems, the transition from the liquid to the solid phase is almost instantaneous, with the result that the liquid reaction mixture hardens on the walls of the mold.

It is possible by this process to fill voluminous and, at the same time, thin-walled (wall thickness <3 mm), complicated mold cavities. Still-liquid material which continues to enter the mold under the filling pressure of the machine until the filling process is over would appear to force itself through between the peripheral zones of the molding hardening on the walls of the mold. This would appear to account for the fact that it is possible to produce moldings having greater weights than would appear theoretically possible by comparison of the cream time with the filling time (for a given filling volume per second). Thus, it is possible to exceed the filling time by up to 50% in relation to the cream time. On completion of the shot, the reaction mixture as a whole hardens so quickly that, in the case of highly reactive batches, the mold may be opened after less than five seconds and the molding removed therefrom.

Another advantage of these new systems is that their self-separating properties are better than those of the known systems i.e. for the manufacture of molded polyurethane foams so that it is possible to work without release agents at least if simple moldings such as plates are made.

Although it is possible in principle to fill voluminous mold cavities using the system according to German Offenlegungsschrift No. 2,622,951 (British Pat. No. 1,534,258), these known systems still do not fully satisfy practical requirements. Because of the extremely short cream and filling times, these known systems are still not optimally suitable for the production of very thin moldings. For example, the mass production of reversibly formable front and rear sections of automobiles are not practical because faults attributable to incomplete filling of the mold are often encountered. This applies in particular where the reaction injection molding machines currently available are used. Although it would be possible to compensate for the above-mentioned disadvantages of conventional systems by using specialized reaction injection molding machines having a considerably increased output, this would require a considerable additional capital investment in machinery.

An object of the instant invention is to improve the systems according to German Offenlegungsschrift No. 2,622,951 (British Pat. No. 1,534,258) in such a way that it is possible and practical to mass produce large-volume, thin-walled moldings weighing from 3 to 10 kg using available reaction injection molding machines. More particularly, this object is realized in the present invention by increasing the cream time or pourability of the conventional systems referred to above without, at the same time, significantly affecting the short in-mold time required.

In the present invention, this object is achieved by using polyhydroxy polyethers containing incorporated ethylene oxide units and secondary hydroxyl groups which are described in detail below. The achievement of this object in the present invention is surprising because, initially, it had been expected that the cream time would largely be determined by the more reactive amine component and not by the nature of the hydroxyl groups of the polyether. It had not been expected that only polyether polyols containing incorporated ethylene oxide units would produce the required effect. It was surprisingly found that corresponding polyether polyols having the same content of secondary hydroxyl groups, but without the incorporated ethylene oxide units, did not produce the required result. The systems according to German Offenlegungsschrift No. 2,622,951 which, by virtue of the mechanical properties thereof, are ideally suitable for the production of large-volume, flexible bodywork sections ("soft-face" elements) have, for example, a cream time of approximately two seconds and lead to moldings which may be mold-released after from 0.25 to 2 minutes. By using the polyether polyols of the present invention in otherwise the same formulation, it is possible to double the cream time for the same in-mold time.

BRIEF DESCRIPTION OF THE INVENTION

The present invention relates to a process for the production of elastic moldings which comprises reacting a reaction mixture comprising:

(a) organic polyisocyanates;

(b) polyhydroxy polyethers having a molecular weight of from 1,000 to 12,000;

(c) aromatic diamines or polyamines as chain-extending agents;

(d) catalyst for the reaction between hydroxyl groups and isocyanate groups; and (e) optionally blowing agents, auxiliaries and additives known in polyurethane chemistry; the reaction mixture being processed as a one-shot system by the reaction injection molding technique and the reactants being used in quantities corresponding to an isocyanate index of from 70 to 130, characterized in that component (b) is formed by polyhydroxy polyethers, from 10 to 80% by weight of whose polyether chains consist of ethylene oxide units and at least 50% of whose hydroxyl groups consist of secondary hydroxyl groups.

Starting components (a) suitable for use in the present invention are aliphatic, cycloaliphatic, araliphatic, aromatic and heterocyclic polyisocyanates of the type described, for example, by W. Siefken in Justus Liebigs Annalen der Chemie, 562, pages 75 to 136. Specific examples of these compounds are ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190); 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate; 2,4- and 2,6-tolylene diisocyanate and mixtures of these isomers are also suitable in the instant invention. Diphenylmethane-2,4'- and/or -4,4'-diisocyanate; naphthylene-1,5-diisocyanate; triphenylmethane-4,4',4"-triisocyanate; polyphenyl polymethylene polyisocyanates of the type obtained by condensing aniline with formaldehyde, followed by phosgenation, and described, for example, in British Pat. Nos. 874,430 and 848,671, may also be used in the present invention. m- and p-isocyanato-phenyl sulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162); diisocyanates of the type described in U.S. Pat. No. 3,492,330 and polyisocyanates containing allophanate groups of the type described, for example, in British Pat. No. 994,890, in Belgian Pat. No. 761,626 and in published Dutch Patent Application No. 7,102,524 are still further examples of suitable components (a). Additionally, polyisocyanates containing isocyanurate groups of the type described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups of the type described, for example, in Belgian Pat. No. 752,261 or in U.S. Pat. No. 3,394,164; polyisocyanates containing acylated urea groups according to German Pat. No. 1,230,778 and polyisocyanates containing biuret groups of the type described, for example, in German Pat. No. 1,101,394 (U.S. Pat. Nos. 3,124,605 and 3,201,372) and in British Pat. No. 889,050 are suitable as component (a). Polyisocyanates produced by telomerization reactions of the type described, for example, in U.S. Pat. No. 3,654,106, polyisocyanates containing ester groups of the type described, for example, in British Pat. Nos. 965,474 and 1,072,956, in U.S. Pat. No. 3,567,763 and in German Pat. No. 1,231,688, reaction products of the above-mentioned isocyanates with acetals according to German Pat. No. 1,072,385 and polyisocyanates containing polymeric fatty acid residues according to U.S. Pat. No. 3,455,883 are still further examples of suitable components (a) in the instant invention.

Aromatic polyisocyanates which are liquid at the processing temperature are preferably used as component (a). The particularly preferred starting components (a) include derivatives of 4,4'-diisocyantodiphenylmethane which are liquid at room temperature, for example, liquid polyisocyanates containing urethane groups, of the type obtainable in accordance with German Pat. No. 1,618,380 (U.S. Pat. No. 3,644,457). These may be produced by reacting 1 mol of 4,4'-diisocyanatodiphenylmethane with from 0.05 to 0.3 mols of molecular weight diols or triols, preferably polypropylene glycols having a molecular weight below 700 or diisocyanates based on diphenylmethane diisocyanate containing carbodiimide and/or uretone imine groups of the type obtainable, for example, in accordance with German Pat. No. 1,092,007 (U.S. Pat. No. 3,152,162). Mixtures of these preferred polyisocyanates are also preferably used. In general, aliphatic and cycloaliphatic isocyanates are less suitable for the purposes of the instant invention.

Component (b) is formed by polyhydroxy polyethers having an average molecular weight of from 1,000 to 12,000, preferably from 2,000 to 8,000. Average molecular weight may be calculated, for example, from the hydroxyl content and the mean functionality. From 10 to 80% by weight, preferably from 30 to 60% by weight, of these polyether chains consist of ethylene oxide units and at least 50%, preferably at least 90%, generally up to approximately 100%, of the hydroxyl groups therein consist of secondary hydroxyl groups. In addition to ethylene oxide units, the polyether chains preferably contain propylene oxide units. The content of incorporated ethylene oxide units may be determined, for example, by NMR analysis. The content of secondary hydroxyl groups after acetylation may also be determined by known methods of NMR analysis.

The polyhydroxy polyethers of the present invention are produced in known manner by alkoxylating suitable starter molecules. The ethylene oxide units are incorporated by the addition of ethylene oxide or mixtures of ethylene oxide with other epoxides, preferably propylene oxide. The secondary hydroxyl groups preferably are incorporated by the addition of propylene oxide at the end of the chain. Epoxides other than those mentioned may also be used in the production of the polyhydroxy polyethers of the present invention, provided that the polyhydroxy polyethers obtained correspond to the above definition. Suitable starter components are the conventional low molecular weight compounds containing active hydrogen atoms, such as water, ammonia, alcohols or amines. Some suitable examples are ethylene glycol; 1,3-propylene glycol or 1,2-propylene glycol; trimethylol propane; 4,4'-dihydroxy diphenylpropane; aniline; ethanolamine or ethylene diamine. Sucrose polyethers of the type described, for example, in German Auslegeschriften Nos. 1,176,358 and 1,064,938 may also be used in the present invention, in which case the polyhydroxy polyethers preferably have a mean OH functionality of from 2 to 4.

It is also possible to use polyethers corresponding to the above definition which have been subsequently modified in known manner. These modified polyethers include polyethers modified, for example, by vinyl polymers of the type formed, for example, by the polymerization of styrene and acrylonitrile in the presence of polyethers (U.S. Pat. Nos. 3,383,351; 3,304,273; 3,523,093; 3,110,695 and German Pat. No. 1,152,536). Another suitable type of modified polyether is one modified with polyhydroxyl compounds containing high molecular weight polyadducts or polycondensates in finely disperse or dissolved form. Such modified polyhydroxyl compounds are obtained by carrying out polyaddition reactions (for example, reactions between polyisocyanates and aminofunctional compounds) or polycondensation reactions (for example, between formaldehyde and phenols and/or amines) directly in situ in the above-mentioned compounds containing hydroxyl groups. Such processes are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. However, it is also possible in accordance with U.S. Pat. No. 3,869,413 or German Offenlegungsschrift No. 2,550,860 to mix an aqueous polymer dispersion with a polyhydroxyl compound and subsequently to remove the water from the mixture.

The chain-extending agent (c) consists of any aromatic diamines or polyamines which are preferably liquid or dissolved in the polyol component. "Active" diamines and polyamines are diamines and polyamines whose reactivity to isocyanates is not reduced by electron-attracting substituents, such as halogen, ester, ether or disulfide groups, for example, methylene-bis-chloroaniline (moca).

The chain-extending agent (c) is used in quantities of from 5 to 50% by weight and, with particular preference, from 8 to 35% by weight, based on component (b).

Aromatic amines, which may be used either on their own or in admixture as the chain-extending agent (c) are, for example, 2,4- and 2,6-diamino-toluene; 2,4'- and/or 4,4'-diamino-diphenylmethane; 1,2-, 1,3- and 1,4-phenylene diamine; naphthylene-1,5-diamine and triphenylmethane-4,4',4"-triamine. The difunctional and polyfunctional aromatic amine compounds may also exclusively or partly contain secondary amino groups, such as 4,4'-di-(methylamino)-diphenylmethane or 1-methyl-2-methyl-amino-4-amino-benzene. Liquid mixtures or polyphenyl-polymethylene-polyamines, of the type obtained by condensing aniline with formaldehyde, are also suitable.

Liquid or dissolved aromatic diamines which contain at least one linear alkyl substituent in the o-position to the first amino group and two linear alkyl substituents containing from 1 to 3 carbon atoms in the o-position to the second amino group, have proved to be particularly suitable for the instant process. Such aromatic diamines are, for example, 1,3-diethyl-2,4-diaminobenzene; 2,4-diaminomesitylene; 1-methyl-3,5-diethyl-2,4-diaminobenzene; 1-methyl-3,5-diethyl-2,6-diaminobenzene; 1,3,5-triethyl-2,6-diaminobenzene; 3,5,3',5'-tetraethyl-4,4'-diaminodiphenylmethane or 3,5,3',5'-tetraisopropyl-4,4'-diamino-diphenylmethane.

The above-mentioned aromatic diamines may, of course, also be used in admixture with one another and also in combination with other active aromatic diamines.

In addition, it is necessary to use suitable catalysts for the reaction between the isocyanate groups and the hydroxyl groups. Without these catalysts, it is not possible to obtain moldings having technically interesting mechanical properties with short in-mold times. Suitable catalysts are, for example, the catalysts mentioned in German Offenlegungsschrift No. 2,622,951. It is preferred to use known organo-metallic catalysts, particularly organo-tin catalysts.

The particularly preferred catalysts include organo-tin compounds of the type which are unable to split off any acid radicals. Such organo-tin compounds include, for example, dibutyl tin(IV-dilauryl mercaptide; dioctyl tin(IV)-dilauryl mercaptide, tin(II)-dilauryl mercaptide and dibutyl tin diacetyl acetonate. With the last-mentioned compounds, it is possible, with advantage, to further lengthen the pouring time. In this connection, it is particularly surprising and, so far as those skilled in the art are concerned, virtually inexplicable that longer pouring times are obtained by increasing the concentration of catalyst.

The catalysts are generally used in a quantity of from about 0.001 to 10% by weight, preferably from 0.05 to 2% by weight, based on the quantity of compounds (b).

Compact moldings are preferably produced without using blowing agents. It is possible, however, to use blowing agents, in which case moldings having an impervious surface and a cellular interior are obtained. Thus, water and/or readily volatile organic compounds may be used as the blowing agents (e). Examples of suitable organic blowing agents are acetone, ethyl acetate, methanol, ethanol, halogen-substituted alkanes, such as methylene chloride, chloroform, ethylidene chloride, vinylidene chloride, monofluorotrichloromethane, chlorodifluoromethane, dichlorodifluoromethane, also butane, hexane, heptane or diethyl ether.

A blowing effect may also be obtained by adding compounds which decompose at temperatures above room temperature with evolution of gases, such as, for example, nitrogen. An example of this kind of compound is azo compounds, such as azoisobutyronitrile. Further examples of blowing agents and information on the use of blowing agents may be found in Kunststoff-Handbuch, Volume VII, by Vieweg and Hochtlen, Carl Hanser Verlag, Munich 1966, for example on pages 108 and 109, 453 to 455 and 507 to 510.

It is also possible to use surface-active additives (emulsifiers and foam stabilizers). Examples of suitable emulsifiers are the sodium salts of castor oil sulfonates or even of fatty acids or salts of fatty acids with amines, such as diethyl amine oleate or diethanolamine stearate. Alkali metal or ammonium salts of sulfonic acid, such as dodecyl benzene sulfonic acid or dinaphthyl methane disulfonic acid or even of fatty acids, such as ricinoleic acid, or of polymeric fatty acids may also be used as surface-active additives.

Suitable foam stabilizers are, above all, water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565.

It is also possible to use known cell regulators, such as paraffins or fatty alcohols, and known flame-proofing agents, for example tris-chloroethyl phosphate or ammonium phosphate and ammonium polyphosphate. It is also possible to use stabilizers against the effects of aging and weather, plasticizers and fungistatic and bacteriostatic substances, as well as fillers, such as barium sulfate, kieselguhr, carbon black or whiting.

Further examples of surface-active additives, foam stabilizers, cell regulators, stabilizers, flameproofing agents, plasticizers, dyes and fillers, fungistatic and bacteriostatic substances and information on the way in which these additives are used and how they work may be found in Kunststoff-Handbuch, Volume VI, by Vieweg and Hoechtlen, Carl Hanser Verlag, Munich 1966, for example on pages 103 to 113.

In the instant process, the quantity in which the polyisocyanate (component (a)) is used is preferably measured in such a way that the foamable mixture has an isocyanate index of from 70 to 130, more particularly from 90 to 110. The isocyanate index is the quotient of the number of isocyanate groups and the number of isocyanate-reactive groups multiplied by 100.

The instant process is carried out by the known reaction injection molding (RIM) technique. The quantity in which the optionally foamable reaction mixture introduced into the mold is measured to produce a molding having a density of from 0.8 to 1.2 g/cc, preferably from 0.9 to 1.1 g/cc.

The starting temperatures of the mixture introduced into the mold is from 10° to 50° C., preferably from 20° to 30° C. The temperature in the mold is from 40° to 100° C., preferably from 50° to 70° C.

Although it is often unnecessary to use release agents i.e. if simple moldings are made internal or external mold release agents may be used if voluminous or thin-walled or complicated molds are to be filled. The known wax-based or silicone-based release agents may be used. Known internal mold-release agents of the type described, for example, in German Offenlegungschriften Nos. 1,953,637 and 2,121,670, may also be used in the instant process.

The moldings obtainable by the instant process are particularly suitable for the production of flexible automobile fenders and bodywork elements. However, it is also possible, by varying the starting compounds (a) to (e), particularly by using a relatively small quantity of diamine (c), to obtain, for example, flexible polyurethane shoe soles having favorable abrasion behavior and excellent mechanical strength.

EXAMPLES

EXAMPLES 1 TO 5

The formulations described in Examples 1 to 5 were processed by means of nozzle machines operating on the principle of countercurrent injection (HK-machines of the type manufactured by Maschinenfabrik Hennecke GmbH, 5205 St. Augustin 1, Federal Republic of Germany, having a positively controlled mixing head; RIM process). Moldings (Corvette* rear ends) weighing 5.1 kp and having a wall thickness of 3 mm were produced in a nickel-plated steel mold. The steel mold fixed in a closing unit was filled from the longitudinal side through a bar gate.

Trademark

The present invention is not confined solely to the above-mentioned machines. However, the mixing unit used sould have a high output (>0.5 kg/second, preferably >1 kg/second) for the production of such large surface, thin-walled moldings as the above-mentioned bodywork element in order to enable the liquid reaction mixture to be rapidly introduced into the mold.

EXAMPLE 1 (Comparison)

77.00 parts by weight of a polyether having an OH number of 28 and predominantly containing primary hydroxyl groups, produced by the addition of propylene oxide and then ethylene oxide with trimethylol propane (EOX-terminal block);

23.00 parts by weight of a mixture of 65 parts by weight of 1-methyl-3,5-diethyl-2,4-phenylene diamine and 35 parts by weight of 1-methyl-3,5-diethyl-2,6-phenylene diamine; and 0.10 parts by weight of a complex of 1 mol of dibutyl tin dilaurate and 1 mol of 2,3-dimethyl-3,4,5,6-tetrahydropyrimidine; are combined to form a polyol component and processed with 55.00 parts by weight of a reaction product of tripropylene glycol and 4,4'-diphenylmethane diisocyanate (23% by weight of NCO) by the RIM process.

The temperature of the starting materials is 40° C. and the temperature of the mold 55° C. The in-mold time is between 1 and 2 minutes, mold release being possible after a relatively short time.

Even at the maximum output of the machine (2370 g/second), the mold cannot be completely filled. The extremely short filling time (from 1 to 2 seconds) leads to an increase in the internal pressure of the mold. This, in turn, caused expansion of the mold and irregular wall thickness of the molding. This pressure build-up also caused reaction material to escape out of the mold at the gate.

The polyurethane-polyurea elastomer obtained is tempered for one hour at 120° C. The following mechanical properties are determined on the molding:

| Gross density (kg/m$^3$) | (DIN 53420) | 1101 |
|---|---|---|
| Tensile strength (MPa) | (DIN 53504) | 29.2 |
| Elongation at break (%) | (DIN 53504) | 341 |
| Tear propagation resistance (kN/m) with cut | (DIN 53515) | 75 |
| E-modulus (MPa) +65° C. | | 269 |
| (according to Roelig) RT | | 427 |
| −30° C. | | 924 |
| Flexural modulus (MPa) (ASTM-D 790-71) RT | | 361 |

EXAMPLE 2

77.00 parts by weight of a polyether having an OH number of 28, produced by the addition of a mixture of propylene oxide and ethylene oxide and then propylene oxide on its own with propylene glycol (PO-terminal block), having a content of approximately 40% by weight of ethylene oxide units, based on the total quantity of alkylene oxide units and with more than 95% of secondary hydroxyl groups;

23.00 parts by weight of a mixture of 65 parts by weight of 1-methyl-3,5-diethyl-2,4-phenylene diamine and 35 parts by weight of 1-methyl-3,5-diethyl-2,6-phenylene diamine; and 0.50 part by weight of di-n-butyl tin dilauryl mercaptide; are combined to form a polyol component and processed with 55.00 parts by weight of a reaction product of tripropylene glycol and 4,4'-diphenylmethane diisocyanate (23% by weight of NCO) by the RIM process. The processing temperatures and in-mold times are the same as in Example 1.

For an output of 1500 g/second (filling time 6.7 seconds), it is possible in this case, in contrast to Example 1, to obtain satisfactory filling of the mold. The polyurethane-polyurea elastomer obtained is tempered for one hour at 120° C. The following mechanical properties are determined on the molding:

| Gross density (kg/m$^3$) | (DIN 53420) | 1116 |
|---|---|---|
| Tensile strength (MPa) | (DIN 53504) | 32.8 |
| Elongation at break (%) | (DIN 53504) | 397 |
| Tear propagation resistance (kN/m) with cut | (DIN 53515) | 111 |
| E-modulus (MPa) +65° C. | | 172 |
| (according to Roelig) RT | | 1260 |
| −30° C. | | 1260 |
| Flexural modulus (MPa) (ASTM-D 790-71) | | 185 |

EXAMPLE 3

77.00 parts by weight of a polyether having an OH number of 56 produced by the addition of a mixture of propylene oxide and ethylene oxide and then propylene on its own with propylene glycol (PO terminal block), having an ethylene oxide content of approximately 50% by weight, based on the total quantity of alkylene oxide units, and with more than 95% of secondary hydroxyl groups;

23.00 parts by weight of a mixture of 65 parts by weight of 1-methyl-3,5-diethyl-2,4-phenylene diamine and 35 parts by weight of 1-methyl-3,5-diethyl-2,6-phenylene diamine; and 0.50 part by weight of di-n-butyl dilauryl mercaptide; are combined to form a polyol component and processed with 63.00 parts by weight of a reaction product of tripropylene glycol and 4,4'-diphenylmethane diisocyanate (23% by weight of NCO) by the RIM process. The processing temperatures and the in-mold time are the same as in Example 1.

For an output of 1700 g/second (filling time 3.2 seconds), the mold may be satisfactorily filled. The polyurethane-polyurea elastomer obtained is tempered for one hour at 120° C.

The following mechanical properties are determined on the molding:

| Gross density (kg/m³) | (DIN 53420) | 1127 |
|---|---|---|
| Tensile strength (MPa) | (DIN 53504) | 41.0 |
| Elongation at break (%) | (DIN 53504) | 380 |
| Tear propagation resistance kN/m) with cut | (DIN 53515) | 100 |
| E-modulus (MPa) +65° C. | | 158 |
| (according to Roelig) RT | | 351 |
| −30° C. | | 2070 |
| Flexural modulus (MPa) (ASTM-D 790-71) | | 185 |

EXAMPLE 4

77.00 parts by weight of a polyether having an OH number of 56, produced by the addition of a mixture of propylene oxide and ethylene oxide with glycerol, having an ethylene oxide content of approximately 50% by weight, based on the total quantity of alkylene oxide units, and with more than 95% of secondary hydroxyl groups;

23.00 parts by weight of a mixture of 65 parts by weight of 1-methyl-3,5-diethyl-2,4-phenylene diamine and 35 parts by weight of 1-methyl-3,5-diethyl-2,6-phenylene diamine; and 0.50 part by weight of di-n-butyl dilauryl mercaptide; are combined to form a polyol component and processed with 63.00 parts by weight of a reaction product of tripropylene glycol and 4,4'-diphenylmethane diisocyanate (23% by weight of NCO) by the RIM process. The processing temperatures and the in-mold time are the same as in Example 1. For an output of 2340 g/second (filling time 2.5 seconds), the mold may be satisfactorily filled. The polyurethane-polyurea elastomer obtained is tempered for one hour at 120° C. The following mechanical properties are determined on the molding:

| Gross density (kg/m³) | (DIN 53420) | 1102 |
|---|---|---|
| Tensile strength (MPa) | (DIN 53504) | 31.2 |
| Elongation at break (%) | (DIN 53504) | 228 |
| Tear propagation resistance (kN/m) with cut | (DIN 53515) | 46 |
| Flexural modulus (MPa) (ASTM-D 790-71) | | 158 |

EXAMPLE 5

77.00 parts by weight of a polyether having an OH number 26, produced by the addition of a mixture of propylene oxide and ethylene oxide and then propylene oxide on its own with glycerol (PO terminal block), containing 30% by weight of ethylene oxide, based on the total quantity of alkylene oxide, and more than 95% of secondary hydroxyl groups;

23.00 parts by weight of a mixture of 80 parts by weight of 1-methyl-3,5-diethyl-2,4-phenylene diamine and 20 parts by weight of 1-methyl-3,5-diethyl-2,6-phenylene diamine; and 0.30 part by weight of di-n-butyl dilauryl mercaptide; are combined to form a polyol component and processed with 46.00 parts by weight of a prepolymer having an NCO content of 26% by weight by the RIM process. The prepolymer is a reaction product of excess quantities of a 4,4'-diisocyanato-diphenylmethane liquefied by partial carbodiimide formation with polypropylene glycol having an average molecular weight of 2000.

For an output of 1500 g/second (filling time 3.7 seconds), the mold may be satisfactorily filled. The processing temperatures and in-mold time are the same as in Example 1. The polyurethane-polyurea elastomer obtained is tempered for one hour at 120° C. The following mechanical properties are determined on the molding:

| Gross density (kg/m³) | (DIN 53420) | 1016 |
|---|---|---|
| Tensile strength (MPa) | (DIN 53504) | 22.8 |
| Elongation at break (%) | (DIN 53504) | 250 |
| Tear propagation resistance (kN/m) with cut | (DIN 53515) | 81 |
| Flexural modulus (MPa) (ASTM-D 790-71) | | 160 |

EXAMPLES 6 to 13

The tests described in Examples 6 to 13 below were carried out under laboratory foaming conditions. After all the components of the mixture had been combined, the reactive mixture was stirred with a laboratory stirrer and subsequently introduced into a closed, tempered vertically arranged metal mold. The temperature of the starting materials is 25° C. and the temperature of the mold 65° C. The internal dimensions of this mold were 200×200×20 mm. The temperature of the mold was 65° C. In each case, the mold was opened after five minutes and the material assessed from the degree of filling of the mold.

EXAMPLE 6

100 parts by weight of a polyether diol having a molecular weight of 2,000, which was produced by ethoxylating propylene glycol and subsequently grafting on propylene oxide, which contains 50% of incorporated ethylene oxide units and less than 5% of whose hydroxyl groups are primary hydroxyl groups, are mixed with 10 parts by weight of the diamine-isomer mixture used in Examples 1 to 4, 1 part by weight of dibutyl tin(IV) dilaurate, 39.8 parts by weight of the diisocyanate used in Example 1 and 10 parts by weight of monochlorotrichloromethane and the resulting mixture introduced into the plate mold described above. After five minutes, the mold is opened. The reaction mixture had levelled satisfactorily in the mold. The hardened polymer material occupies approximately 70% of the mold cavity. In this case, the filling weighed 253 g.

EXAMPLE 7

100 parts by weight of the polyether diol described in Example 6 are mixed with 10 parts by weight of the diamine-isomer mixture described in Example 6, 1 part by weight of dibutyl tin(IV) dilauryl mercaptide, 39.8 parts by weight of the diisocyanate used in Example 1 and 10 parts by weight of monofluorotrichloromethane and the resulting mixture introduced into the described plate mold. The mold is opened after five minutes. The mold cavity is completely filled. The filling weighs 255 g.

EXAMPLE 8 (Comparison)

100 parts by weight of the polyether diol of Example 1 are mixed with 10 parts by weight of the diamine-isomer mixture of Example 1, 1 part by weight of dibutyl tin dilaurate, 29.8 parts by weight of the diisocyanates described in Example 1 and 10 parts by weight of monofluorotrichloromethane. Since the reaction mixture solidifies immediately after contact with the hot mold surface, only 140 g of material may be introduced. Although the end polymer occupies approximately 50% of the mold, the reaction mixture no longer levels in the mold.

EXAMPLE 9 (Comparison)

100 parts by weight of a polypropylene glycol having a molecular weight of 2,000 are mixed with 10 parts by weight of the diamine-isomer mixture of Example 1, 1 part by weight of dibutyl tin dilaurate, 39.4 parts by weight of the diisocyanate of Example 1 and 10 parts by weight of monofluorotrichloromethane. For the reason explained in Example 8, only 130 g of the reaction mixture may be introduced into the plate mold. After the mixture has hardened, approximately 40% of the mold is occupied.

EXAMPLE 10

100 parts by weight of the polyether diol used in Example 6, 15 parts by weight of the diamine-isomer mixture of Example 1, 1 part by weight of dibutyl tin dilauryl mercaptide, 49.6 parts by weight of the diisocyanate used in Example 1 and 10 parts by weight of monofluorotrichloromethane are mixed and introduced into the plate mold. After five minutes, the mold is opened. The hardened polymer material completely occupies the mold. The material has a density of 0.675 g/cc and a Shore A hardness of 72.

EXAMPLE 11

The procedure is as in Example 10, except that 8 parts by weight of tolylene diamine are used instead of 15 parts by weight of diamine-isomer mixture and 43 parts by weight of the diisocyanate of Example 1 are used instead of 49.6 parts by weight. After five minutes, the mold is opened. The hardened polymer material completely occupies the mold. The material has a density of 0.575 g/cc.

EXAMPLE 12

The procedure is as in Example 10, except that 6 parts by weight of o-phenylene diamine are used instead of 15 parts by weight of diamine-isomer mixture and only 39.4 parts by weight of the diisocyanate instead of 49.6 parts by weight. The mold is opened after five minutes. The hardened polymer material completely fills the mold. The material has a density of 0.71 g/cc and a Shore A hardness of 44.

EXAMPLE 13

200 parts by weight of the polyether diol used in Example 6 are processed with 16 parts by weight of the diamine-isomer mixture of Example 1 and 70.5 parts by weight of the diisocyanate of Example 1 to form an elastomer, the pouring time of the reaction mixture being determined in dependence upon the quantity of dibutyl tin dilauryl mercaptide used.

| Dibutyl tin dilauryl mercaptide (parts by weight) | Pouring time (seconds) |
| --- | --- |
| 0.5 | 9 |
| 1.0 | 11 |
| 2.0 | 17 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the production of elastic, shaped articles which comprises reacting a reaction mixture comprising:
   (a) organic polyisocyanates;
   (b) polyhydroxy polyethers having a molecular weight of from 1,000 to 12,000;
   (c) aromatic diamines or polyamines as chain-extending agents; and
   (d) catalysts for the reaction between hydroxyl and isocyanate groups;
   said reaction mixture being processed as one-shot systems by the reaction injection molding technique and said reactants being used in quantities corresponding to an isocyanate index of from 70 to 130, characterized in that component (b) comprises polyhydroxy polyethers from 10 to 80% by weight of the polyether chains therein consisting of ethylene oxide units and at least 50% of the hydroxyl groups consisting of secondary hydroxyl groups.

2. A process as claimed in claim 1 wherein component (a) is formed by aromatic polyisocyanates which are liquid at the processing temperature.

3. A process as claimed in claim 1 wherein component (c) is used in quantities of from 5 to 50% by weight based on component (b).

4. A process as claimed in claim 1 wherein component (c) is formed by aromatic diamines which contain at least one alkyl substituent in the ortho-position to the first amino group and two alkyl substituents each containing from 1 to 3 carbon atoms in the ortho-position to the second amino group.

5. A process as claimed in claim 1 wherein component (d) is formed by organo-tin compounds which are unable to split off any acid radicals.

6. A process as claimed in claim 1 wherein component (b) is formed by polyhydroxy polyethers having a molecular weight of from 2,000 to 8,000, from 30 to 60% by weight comprising polyether chains consisting of ethylene oxide units and from 70 to 40% by weight of propylene oxide units and at least 90% of whose hydroxyl groups consist of secondary hydroxyl groups.

7. A process as claimed in claim 1 wherein said reaction is carried out in closed molds.

8. The process of claim 1 wherein said reaction mixture further comprises blowing agent, and wherein said shaped articles have an impervious surface and a cellular interior.

* * * * *